United States Patent [19]
Nakamura et al.

[11] Patent Number: 5,842,159
[45] Date of Patent: Nov. 24, 1998

[54] METHOD OF AND APPARATUS FOR ANALYZING SENTENCE

[75] Inventors: Naohito Nakamura; Ikuko Nagasawa; Satoko Segawa; Kunio Matsui; Kenji Sugiyama; Manabu Sassano; Makoto Shiotsu, all of Kawasaki, Japan

[73] Assignee: Fujitsu Limited, Kawasaki, Japan

[21] Appl. No.: 412,136

[22] Filed: Mar. 28, 1995

[30] Foreign Application Priority Data

Apr. 6, 1994 [JP] Japan .................................. 6-068737

[51] Int. Cl.$^6$ .................................................. G06F 17/28
[52] U.S. Cl. ................................ 704/4; 704/2; 704/10
[58] Field of Search ...................... 364/419.08, 900, 364/419.04, 419.02, 419.03, 419.11; 395/700; 704/752, 754, 751, 758, 760

[56] References Cited

U.S. PATENT DOCUMENTS

| | | | |
|---|---|---|---|
| 4,630,235 | 12/1986 | Hashimoto | 364/900 |
| 4,641,264 | 2/1987 | Nitta | 364/900 |
| 4,685,060 | 8/1987 | Yamano | 364/419 |
| 4,706,212 | 11/1987 | Toma | 364/900 |
| 5,353,221 | 10/1994 | Kutsumi | 364/419.05 |
| 5,475,586 | 12/1995 | Sata | 364/419.02 |
| 5,541,838 | 7/1996 | Koyama | 364/419.04 |

*Primary Examiner*—Jeffery Hofsass
*Assistant Examiner*—Albert K. Wong
*Attorney, Agent, or Firm*—Staas & Halsey

[57] ABSTRACT

A pattern matching rule for recognizing a weakly linked idiom is previously held in a pattern matching section. If a weakly linked idiom which is registered in the pattern matching rule and has separately placed portions is present in an input sentence, the pattern matching section recognizes the idiom. If the weakly linked idiom is recognized by the pattern matching section, the idiom is replaced by a series of symbolized pattern expressions in a replacing section. A sentence subjected to the replacement process in the replacing section is given to an analyzing section. The analyzing section treats the series of symbolized pattern expressions as one idiom and analyzes the sentence. As a result, the result of analysis in which the weakly linked idiom is adequately processed is obtained as an output of the analyzing section.

31 Claims, 14 Drawing Sheets

FIG. 10

He will {take a degree} easily. ⌒ E2

FIG. 12 take a degree ⌒ E3

He/will/takes/a/degree/easily.

<学位を＊取得>　　・・・ REPLACING SYMBOL

P11　P12

FIG. 16
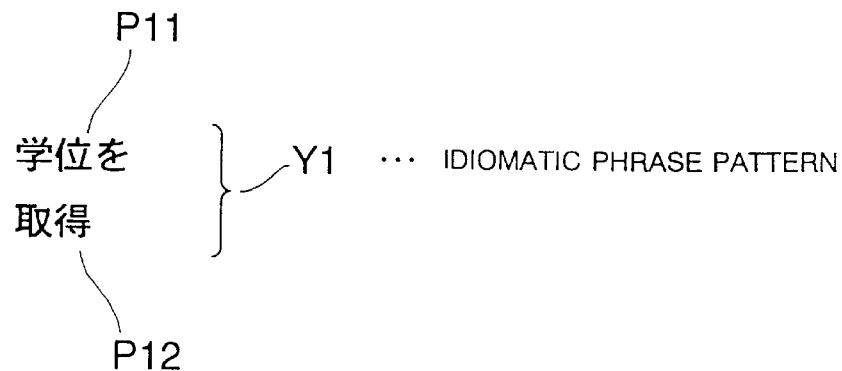
FIG. 17
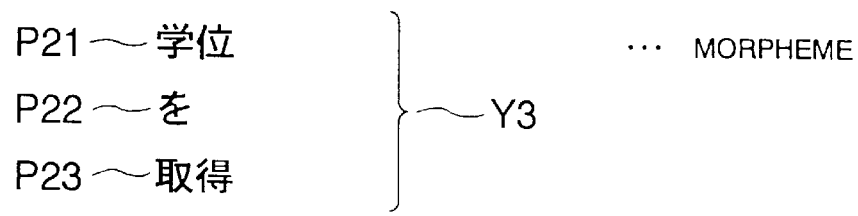
FIG. 18
| P21 ~ 学位 |       |            |
|------------|-------|------------|
| P22 ~ を   | ~ Y3  | ··· MORPHEME |
| P23 ~ 取得  |       |            |

取得　→ <obj> → 学位　　⋯　RESULT OF SYNTAX ANALYSIS

<学位を＊取得>　　　VERB INDEPENDENT WORD

FIG. 21

Z1 take a degree　　VERB REGULARY ⋯

(NOUN)　(AUXILIARY　(ADJECTIVE:　(ADJECTIVE:
　　　　　PARTICLE)　STEM)　　　PARTICIPIAL
　　　　　　　　　　　　　　　　ADJECTIVE)

P54　　　　P55

→ [＊A]　[＊B] 寛大　　　　な　　　　[＊C]

(ADJECTIVE: STEM)　(ADJECTIVE:
　　　　　　　　　　PARTICIPIAL
　　　　　　　　　　ADJECTIVE)

→＊A＊B＜GENEROUS＞＊C

彼は< GENEROUS >人だ。

METHOD OF AND APPARATUS FOR ANALYZING SENTENCE

BACKGROUND OF THE INVENTION

FIELD OF THE INVENTION

This invention relates to a language processing system for processing natural language and more particularly to a sentence analyzing method of and apparatus for effectively processing an idiom in a sentence.

DESCRIPTION OF THE RELATED ART

Generally, a sentence expressed in natural language is constructed by a plurality of words. It is also safe to say that a sentence can be constructed by a plurality of morphemes. Such unit portions as words or morphemes which construct the sentence have their own meanings, and at the same time, a combination of unit portions makes a particular meaning as a so-called idiom. Idioms are used in a sentence not only in a manner that a plurality of portions, for example, words thereof are successively placed but also in a manner that a plurality of portions thereof are separately placed. Some of the idioms may have the same meaning irrespective of whether the portions of the idiom are successively placed or separately placed. The idiom having a plurality of portions which can be separately placed is called a "weakly linked idiom".

For example, the idiom "agree with" in a sentence of "I agree with him very well" can be separately placed as in a sentence "I agree very well with him" without changing the meaning of the sentence. The word "agree with" is the above-described "weakly linked idiom".

In the conventional language processing apparatus, when a weakly linked idiom is contained in a sentence, the idiom cannot be recognized and the separated portions can only be treated as independent words, thus giving a bad influence on the result of processing such as analysis or translation.

That is, since the idiom "agree with" in the following sentence is used in a successive form, it can be processed by the conventional technique.

"I {agree with} him very well."

However, since the words "agree" and "with" in the idiom "agree with" are separately placed in the following sentence, the idiom cannot be processed as an idiom by the conventional technique.

"I {agree} very well {with} him."

Thus, since a sentence in which the words "agree"and "with" of the idiom "agree with", for example, are separately placed cannot be processed by the conventional technique, the following problem will occur.

For example, when an English sentence "We agree very well with him" is translated into another language by use of a translation system, the separated words "agree" and "with" cannot be recognized as the idiom "agree with" and recognized as independent words "agree" and "with". In this case, for example, the sentence "We agree very well with him" may be erroneously recognized as "We agree one another very well on account of him" in an extremely case, and as a result, the sentence is erroneously translated.

In order to solve the above problem by use of the conventional system, a method of connecting the separated portions of the idiom by the grammatical processing and then processing the sentence is considered, however, in order to cope with various cases, the grammatical processing becomes extremely complicated.

SUMMARY OF THE INVENTION

An object of this invention is to provide a sentence analyzing method and apparatus capable of adequately recognizing a weakly linked idiom in a sentence in a simple processing and correctly analyzing the idiom in the same manner for processing a word or normal strongly linked idiom.

A sentence analyzing method according to a first aspect of this invention comprises a pattern matching step, replacing step and analyzing step.

The pattern matching step is to prepare a pattern matching rule for idioms having a plurality of portions which can be separately placed, subject a sentence to the pattern matching based on the pattern matching rule and recognize the idiom having separately placed portions.

The replacing step is to replace the plurality of portions constructing the idiom recognized by the pattern matching by a series of symbolized pattern expressions.

The analyzing step is to analyze the sentence processed in the replacing step.

The pattern matching step may include a step of effecting the pattern matching based on a character string pattern, a step of effecting the pattern matching based on a pattern of the result of morpheme analysis, or a step of effecting the pattern matching based on a pattern of the result of syntax analysis.

A sentence analyzing method according to a second aspect of this invention comprises an input step, rule creating step, pattern matching step, replacing step and analyzing step.

The input step is to receive a sentence including an idiom portion having a plurality of separately placed portions and having a mark attached thereto.

The rule creating step is to analyze the input sentence and create a pattern matching rule for recognizing the idiom portion having a plurality of separately placed portions and having the mark attached thereto.

The pattern matching step is to effect the pattern matching for the sentence based on the pattern matching rule created in the rule creating step and recognize the idiom having the separately placed portions.

The replacing step is to replace the plurality of portions constructing the idiom recognized by the pattern matching by a series of symbolized pattern expressions.

The analyzing step is to analyze the sentence processed in the replacing step.

The rule creating step may include a step of creating the pattern matching rule based on a character string pattern, a step of creating the pattern matching rule based on a pattern of the result of morpheme analysis, or a step of creating the pattern matching rule based on a pattern of the result of syntax analysis.

The pattern matching step may include a step of effecting the pattern matching based on a character string pattern, a step of effecting the pattern matching based on a pattern of the result of morpheme analysis, or a step of effecting the pattern matching based on a pattern of the result of syntax analysis according to a corresponding one of the above rule creating steps.

A rule creating method according to a third aspect of this invention comprises an input step, and a rule creating step.

The input step is to receive a sentence including an idiom portion having a plurality of separately placed portions and having a mark attached thereto.

The rule creating step is to analyze the input sentence and create a pattern matching rule for recognizing the idiom portion having a plurality of separately placed portions and having the mark attached thereto.

The rule creating step may include a step of creating the pattern matching rule based on a character string pattern, a step of creating the pattern matching rule based on a pattern of the result of morpheme analysis, or a step of creating the pattern matching rule based on a pattern of the result of syntax analysis.

A sentence analyzing apparatus according to a fourth aspect of this invention comprises a pattern matching section, replacing section and analyzing section.

The pattern matching section holds a pattern matching rule for idioms each having a plurality of portions which can be separately placed, effects the pattern matching for the sentence based on the pattern matching rule and recognizes the idiom having the separately placed portions.

The replacing section replaces the plurality of portions constructing the idiom recognized by the pattern matching section by a series of symbolized pattern expressions.

The analyzing section analyzes the sentence processed in the replacing section.

The pattern matching section may effect the pattern matching based on a character string pattern, a pattern of the result of morpheme analysis, or a pattern of the result of syntax analysis.

A sentence analyzing apparatus according to a fifth aspect of this invention comprises an input section, rule creating section, pattern matching section, replacing section and analyzing section.

The input section receives a sentence including an idiom portion having a plurality of separately placed portions and having a mark attached thereto.

The rule creating section analyzes the input sentence and creates a pattern matching rule for recognizing the idiom portion having a plurality of separately placed portions and having the mark attached thereto.

The pattern matching section effects the pattern matching for the sentence based on the pattern matching rule created by the rule creating section and recognizes the idiom having the separately placed portions.

The replacing section replaces the plurality of portions constructing the idiom recognized by the pattern matching section by a series of symbolized pattern expressions.

The analyzing section analyzes the sentence processed in the replacing section.

The rule creating section may create a pattern matching rule based on a character string pattern, a pattern of the result of morpheme analysis, or a pattern of the result of syntax analysis.

The pattern matching section effects the pattern matching based on a character string pattern, a pattern of the result of morpheme analysis, or a pattern of the result of syntax analysis according to the rule created by the above rule creating section.

A rule creating apparatus according to a sixth aspect of this invention comprises an input section and a rule creating section.

The input section receives a sentence including an idiom portion having a plurality of separately placed portions and having a mark attached thereto.

The rule creating section analyzes the input sentence and creates a pattern matching rule for recognizing the idiom portion having a plurality of separately placed portions and having the mark attached thereto.

The rule creating section may create a pattern matching rule based on a character string pattern, a pattern of the result of morpheme analysis, or a pattern of the result of syntax analysis.

In the sentence analyzing method according to the first aspect of this invention, the pattern matching rule is prepared for the idioms each having a plurality of portions which can be separately placed, the pattern matching for the sentence is effected based on the pattern matching rule to recognize the idiom having separately placed portions in the pattern matching step, the plurality of portions constructing the idiom recognized by the pattern matching is replaced by a series of symbolized pattern expressions in the replacing step, and the sentence processed in the replacing step is analyzed in the analyzing step.

With the above method, since the weakly linked idiom is subjected to analysis after being previously replaced by the series of symbolized expressions by the pattern recognition, the weakly linked idiom can always be treated as an idiom even when the portions thereof are separately placed, thus making it possible to adequately attain the sentence analysis in a simple operation.

For the pattern matching, a character string pattern, a pattern of the result of morpheme analysis, or a pattern of the result of syntax analysis can be used and a pattern for sentence analysis may be used.

In the sentence analyzing method according to the second aspect of this invention, a sentence including an idiom portion having a plurality of separately placed portions and having a mark attached thereto is received in the input step, the input sentence is analyzed and a pattern matching rule for recognizing the idiom portion having a plurality of separately placed portions and having the mark attached thereto is created in the rule creating step, the pattern matching for the sentence is effected based on the pattern matching rule to recognize the idiom having the separately placed portions in the pattern matching step, the plurality of portions constructing the idiom recognized in the pattern matching step are replaced by a series of symbolized pattern expressions in the replacing step, and the sentence processed in the replacing step is supplied for analysis in the analyzing step.

With the above method, since the pattern matching rule for subjecting the weakly linked idiom to the pattern recognition is created based on an input sentence having a mark attached to a corresponding portion thereof and the weakly linked idiom is subjected to analysis after being previously replaced by a series of symbolized pattern expressions by the pattern recognition, the pattern matching rule can be easily created even if the pattern matching rule for recognizing the weakly linked idiom is not previously prepared, and the weakly linked idiom can always be treated as an idiom even when the portions thereof are separately placed, thus making it possible to attain the adequate sentence analysis.

For creation of the rule, the pattern matching rule may be created based on a character string pattern, a pattern of the result of morpheme analysis, or a pattern of the result of syntax analysis. Further, for the pattern matching, the pattern matching may be effected based on a character string pattern, a pattern of the result of morpheme analysis, or a pattern of the result of syntax analysis according to a corresponding one of the above created rules.

In the rule creating method according to the third aspect of this invention, a sentence including an idiom portion having a plurality of separately placed portions and having a mark attached thereto is received in the input step, and the input sentence is analyzed and a pattern matching rule for recognizing the idiom portion having a plurality of separately placed portions and having the mark attached thereto is created in the rule creating step.

With the above method, the matching rule for subjecting the weakly linked idiom to the replacement process by the pattern matching can be easily and automatically created.

For creation of the rule, the pattern matching rule may be created based on a character string pattern, a pattern of the result of morpheme analysis, or a pattern of the result of syntax analysis.

In the sentence analyzing apparatus according to the fourth aspect of this invention, the pattern matching section holds a pattern matching rule for idioms each having a plurality of portions which can be separately placed, effects the pattern matching for the sentence based on the pattern matching rule and recognizes the idiom having the separately placed portions, the replacing section replaces the plurality of portions constructing the idiom recognized by the pattern matching section by a series of symbolized pattern expressions, and the analyzing section analyzes the sentence processed in the replacing section.

With the above apparatus, since the weakly linked idiom is subjected to analysis after being previously replaced by the series of symbolized expressions by the pattern recognition, the weakly linked idiom can always be treated as an idiom even when the portions thereof are separately placed, thus making it possible to adequately attain the sentence analysis in a simple construction.

The pattern matching section may effect the pattern matching based on a character string pattern, a pattern of the result of morpheme analysis, or a pattern of the result of syntax analysis.

In the sentence analyzing apparatus according to the fifth aspect of this invention, the input section receives a sentence including an idiom portion having a plurality of separately placed portions and having a mark attached thereto, the rule creating section analyzes the input sentence and creates a pattern matching rule for recognizing the idiom portion having a plurality of separately placed portions and having the mark attached thereto, the pattern matching section effects the pattern matching for the sentence based on the pattern matching rule created by the rule creating section and recognizes the idiom having the separately placed portions, the replacing section replaces the plurality of portions constructing the idiom by a series of symbolized pattern expressions, and the analyzing section analyzes the sentence processed in the replacing section.

With the above apparatus, since the pattern matching rule for subjecting the weakly linked idiom to the pattern recognition is created based on an input sentence having a mark attached to a corresponding portion thereof and the weakly linked idiom is subjected to analysis after being previously replaced by a series of symbolized pattern expressions by the pattern recognition, the pattern matching rule can be easily created even if the pattern matching rule for recognizing the weakly linked idiom is not previously prepared, and the weakly linked idiom can always be treated as an idiom even when the portions thereof are separately placed, thus making it possible to attain the adequate sentence analysis.

The rule creating section may create a pattern matching rule corresponding to a character string pattern, a pattern of the result of morpheme analysis, or a pattern of the result of syntax analysis.

The pattern matching section may effect the pattern matching based on a character string pattern, a pattern of the result of morpheme analysis, or a pattern of the result of syntax analysis according to the rule created by the above rule creating section.

In the rule creating apparatus according to the sixth aspect of this invention, the input section receives a sentence including an idiom portion having a plurality of separately placed portions and having a mark attached thereto, and the rule creating section analyzes the input sentence and creates a pattern matching rule for recognizing the idiom portion having a plurality of separately placed portions and having the mark attached thereto.

With the above apparatus, the matching rule for subjecting the weakly linked idiom to the replacement process by the pattern matching can be easily and automatically created.

The rule creating section may create a pattern matching rule based on a character string pattern, a pattern of the result of morpheme analysis, or a pattern of the result of syntax analysis.

BRIEF DESCRIPTION OF THE DRAWINGS

FIG. 10 is a figure for concretely illustrating the operation of the idiomatic phrase registration system of FIG. 3;

FIG. 11 is a figure for concretely illustrating the operation of the idiomatic phrase registration system of FIG. 3;

FIG. 12 is a figure for concretely illustrating the operation of the idiomatic phrase registration system of FIG. 3;

FIG. 13 is a figure for concretely illustrating the operation of the idiomatic phrase registration system of FIG. 3;

FIG. 14 is a figure for concretely illustrating the operation of the idiomatic phrase registration system of FIG. 3;

FIG. 15 is a figure for concretely illustrating the operation of the idiomatic phrase registration system of FIG. 3;

FIG. 16 is a figure for concretely illustrating the operation of the idiomatic phrase registration system of FIG. 3;

FIG. 17 is a figure for concretely illustrating the operation of the idiomatic phrase registration system of FIG. 3;

FIG. 18 is a figure for concretely illustrating the operation of the idiomatic phrase registration system of FIG. 3;

FIG. 19 is a figure for concretely illustrating the operation of the idiomatic phrase registration system of FIG. 3;

FIG. 20 is a figure for concretely illustrating the operation of the idiomatic phrase registration system of FIG. 3;

FIG. 21 is a figure for concretely illustrating the operation of the idiomatic phrase registration system of FIG. 3;

FIG. 22 is a figure for concretely illustrating the operation of the idiomatic phrase registration system of FIG. 3;

FIG. 23 is a figure for concretely illustrating the operation of the idiomatic phrase registration system of FIG. 3;

FIG. 24 is a figure for concretely illustrating the operation of the idiomatic phrase registration system of FIG. 3;

FIG. 28 is a figure for concretely illustrating the operation of the machine translation system of FIG. 5;

FIG. 29 is a figure for concretely illustrating the operation of the machine translation system of FIG. 5;

FIG. 30 is a figure for concretely illustrating the operation of the machine translation system of FIG. 5;

FIG. 31 is a figure for concretely illustrating the operation of the machine translation system of FIG. 5; and FIG. 32 is a figure for concretely illustrating the operation of the machine translation system of FIG. 5.

DETAILED DESCRIPTION OF THE PREFERRED EMBODIMENTS

There will now be described embodiments of this invention with reference to the accompanying drawings.

[First Embodiment]

Figure 1:
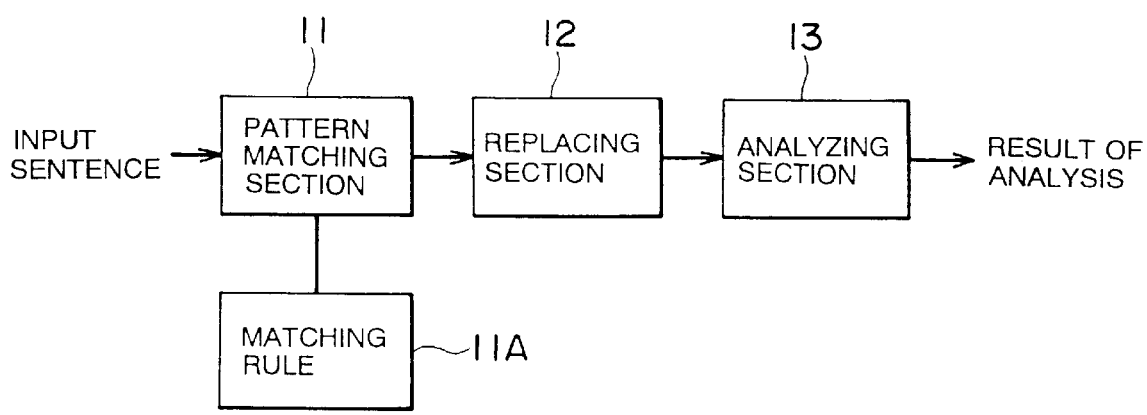
FIG. 1 is a block diagram showing the construction of a principle sentence analyzing apparatus according to a first embodiment of this invention.

The construction of a principle sentence analyzing apparatus according to a first embodiment of this invention is shown in FIG. 1.

The sentence analyzing apparatus of FIG. 1 includes a pattern matching section 11, replacing section 12 and analyzing section 13.

The pattern matching section 11 holds a pattern matching rule 11A for idioms (having portions which can be not only successively placed but also separately placed) having a plurality of separately placed portions (for example, morphemes or words) and recognizes the idiom by subjecting an input sentence to the pattern matching based on the pattern matching rule 11A.

The replacing section 12 replaces a plurality of portions constructing the idiom recognized by the pattern matching section 11 by a series of symbolized pattern expressions.

The analyzing section 13 analyzes the sentence processed in the replacing section and outputs the result of analysis.

The pattern matching section 11 may effect the pattern matching based on a character string pattern, a pattern of the result of morphemic analysis, or a pattern of the result of syntax analysis.

With the above construction, the pattern matching rule 11A for recognizing the "weakly linked idiom" described before is previously held in the pattern matching section 11. When the pattern matching section 11 detects that the weakly linked idiom registered in the pattern matching rule 11A and having separately placed portions is present in an input sentence, the pattern matching section 11 recognizes the idiom. When the weakly linked idiom is recognized in the pattern matching section 11, the idiom is replaced by a series of symbolized pattern expressions in the replacing section 12. The sentence subjected to the replacing process in the replacing section 12 is supplied to the analyzing section 13. The analyzing section 13 treats the series of symbolized pattern expressions as one idiom and analyzes the sentence. As a result, the result of analysis in which the weakly linked idiom is adequately processed can be obtained as an output of the analyzing section 13.

Thus, the weakly linked idiom having separately placed portions can be treated as one idiom and the adequate result of sentence analysis can be obtained although only a simple process is effected by use of a relatively simple construction.

According to the sentence analyzing apparatus of FIG. 1, a sentence containing a weakly linked idiom which cannot be correctly analyzed in the prior art can be correctly analyzed simply by adding the pattern matching function and replacing function to the conventional system.

[Second Embodiment]

Figure 2:
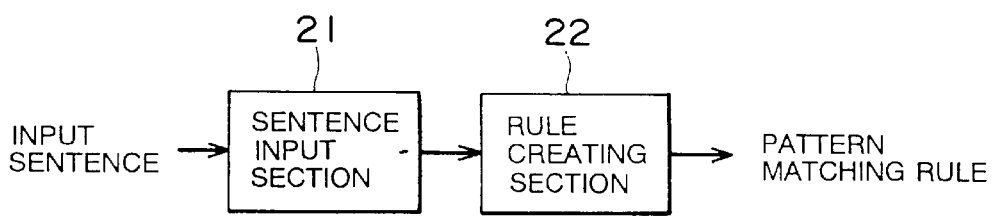
FIG. 2 is a block diagram showing the construction of a rule creating apparatus for sentence analysis according to a second embodiment of this invention.

The construction of a principle rule creating apparatus according to a second embodiment of this invention is shown in FIG. 2.

The rule creating apparatus shown in FIG. 2 is used to create a pattern matching rule 11A used in a pattern matching section 11 of the sentence analyzing apparatus of FIG. 1 by registering idiomatic phrases and includes an input section 21 and a rule creating section 22.

The input section 21 receives a sentence which includes an idiom portion having a plurality of separately placed portions and having a mark previously attached thereto. The input sentence is an input sentence having a mark which is previously attached thereto to indicate a weakly linked idiom, for example, the weakly linked idiom is put into braces "{" and "}". The sentence is created by a user by use of an editor, for example.

The rule creating section 22 analyzes the input sentence, processes the idiom portion having a plurality of separately placed portions and having the mark attached thereto, and creates a pattern matching rule for recognizing the idiom. The pattern matching rule is used as the pattern matching rule 11A of FIG. 1.

The rule creating section 22 may create a pattern matching rule based on a character string pattern, a pattern of the result of morpheme analysis, or a pattern of the result of syntax analysis.

Thus, the pattern matching rule for recognizing the weakly linked idiom can be created and the adequate sentence analysis can be attained by use of the thus created pattern matching rule by such a sentence analyzing apparatus as shown in FIG. 1.

The rule creating apparatus of FIG. 2 may be combined with the sentence analyzing apparatus shown in FIG. 1 to construct a language processing system.

According to the rule creating apparatus of FIG. 2, the operation of the user for creating a rule can be omitted by automatically creating a pattern matching rule used in the sentence analyzing apparatus of FIG. 1.

[Third Embodiment]

Figure 3:
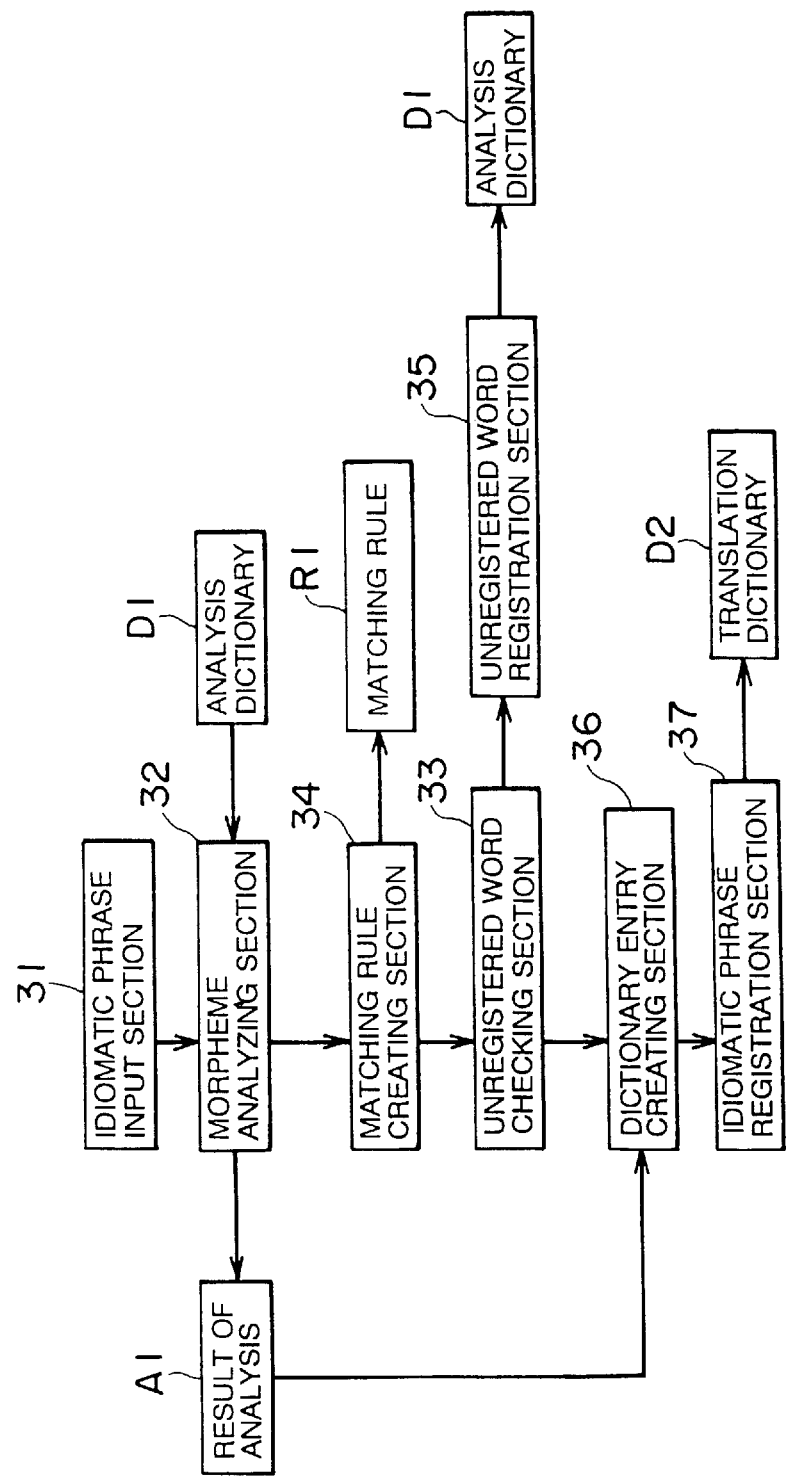
FIG. 3 is a block diagram showing the construction of an idiomatic phrase registration system including a sentence analyzing apparatus according to a third embodiment of this invention.

The construction of an idiomatic phrase registration system including a concrete rule creating apparatus according to a third embodiment of this invention is shown in FIG. 3.

The idiomatic phrase registration system shown in FIG. 3 is an idiomatic phrase registration system in a Japanese-English translation system and is used to register idiomatic phrases and create a pattern matching rule used for processing a weakly linked idiom according to this invention.

In the idiomatic phrase registration system, only if the user specifies an idiom which he wants to register on the bilingual editor by putting the idiom into braces "{" and "}", for example, the idiomatic phrase is registered on the dictionary, and at the same time, the pattern matching rule is automatically created. That is, the user specifies and inputs an idiomatic phrase which he wants to register, the idiomatic phrase registration system effects the morpheme analysis of a sentence containing the idiomatic phrase to automatically create a dictionary entry of the idiomatic phrase based on the result of morpheme analysis and register the same into the translation dictionary. In the case of weakly linked idiom, a pattern matching rule used for translation is automatically created at the same time as the processing of registration into the dictionary.

The idiomatic phrase registration system of FIG. 3 includes an idiomatic phrase input section 31, morpheme analyzing section 32, unregistered word checking section 33, matching rule creating section 34, unregistered word registering section 35, dictionary entry creating section 36 and idiomatic phrase dictionary registering section 37.

If the user inputs data having a portion which the user wants to change into a correct translated word on the bilingual editor and register the same, that is, an idiomatic phrase put into braces "{" and "}" to the idiomatic phrase input section 31, the system checks the specifying braces, that is, the nesting of braces and unpaired brace to extract only the portion put in the braces and store the same as idiomatic phrase data.

Figure 7:
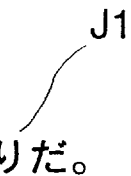
FIG. 7 is a figure for concretely illustrating the operation of the idiomatic phrase registration system of FIG. 3.
Figure 8:
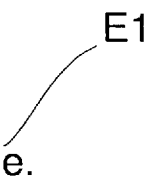
FIG. 8 is a figure for concretely illustrating the operation of the idiomatic phrase registration system of FIG. 3.

For example, suppose that a Japanese sentence J1 shown in FIG. 7 is used as a text and a translated sentence of English sentence El shown in FIG. 8 is obtained as the result of translation into English.

The reading (or pronunciation) of the Japanese sentence J1 is "kare wa gakuiwo kantanni shyutokusuru tsumorida" and the meaning thereof is "He will take a degree easily".

The English sentence El of FIG. 8 is "He will easily acquire the degree" and is not translated to correctly express the meaning of the above Japanese sentence J1.

Figure 9:
FIG. 9 is a figure for concretely illustrating the operation of the idiomatic phrase registration system of FIG. 3.

Therefore, the user corrects the Japanese sentence J1 and English sentence E1 on the bilingual editor, puts the idiomatic phrase portion to be registered into braces to make a Japanese sentence J2 shown in FIG. 9 and an English sentence E2 shown in FIG. 10 as the translated sentence thereof.

The thus corrected Japanese sentence J2 and English sentence E2 are input to the system as the text and translated sentence. The idiomatic phrase input section 31 extracts idiomatic phrase data from the input sentence and stores the same as idiomatic phrase data constructed by Japanese data J3 and English data E3 respectively shown in FIGS. 11 and 12.

The reading or pronunciation of the Japanese data J3 shown in FIG. 11 is "gakuiwo" and "shutoku" respectively corresponding to "degree" and "take". The English data E3 shown in FIG. 12 is an idiomatic phrase of "take a degree" corresponding to the Japanese data J3.

The morpheme analyzing section 32 subjects the input sentence to the morpheme analysis to extract part-of-speech application information or the like from the analyzing dictionary for each morpheme.

In this case, the sentence as described above is input. First, the Japanese sentence is divided into morphemes J40, J41, J42, J43, J44, J45, J46, J47, L48 and J49 as in the Japanese sentence J4 shown in FIG. 13 (in FIG. 13, the division between the morphemes is indicated by "/ (slant)".

Next, each morpheme shown in FIG. 13 is looked up in the dictionary to obtain parts of speech and morpheme information as follows.

The morpheme J40 is read or pronounced as "kare" and is a personal pronoun, and the morpheme information thereof is an independent word indicating a person and corresponds to "he".

The morpheme J41 is read as "wa" and is a post positional word functioning as an auxiliary to a main word (or auxiliary particle), and the morpheme information thereof is an adjunct word.

The morpheme J42 is read as "gakui" and is a common noun, and the morpheme information thereof is an independent word and corresponds to "degree".

The morpheme J43 is read as "wo" and is a different type of auxiliary particle, and the morpheme information thereof is an adjunct word.

The morpheme J44 is read as "kantan" and is an adjective, and the morpheme information thereof is a stem and corresponds to "easily".

The morpheme J45 is read as "ni" and is an adjective, and the morpheme information thereof is an inflection.

The morpheme J46 is read as "shutoku" and is an "s" series irregular conjugation noun (which can be modified into a verb by adding an inflection thereto), and the morpheme information thereof is an independent word and corresponds to "take".

The morpheme J47 is read as "suru" and is an "s" series irregular noun connective auxiliary-particle (which takes the same form in the end form and in the participial adjective form), and the morpheme information thereof is an adjunct word (constructing the inflection).

The morpheme J48 is read as "tsumori" and is an end-form connective auxiliary particle, and the morpheme information thereof is an adjunct word indicating the future will.

The morpheme J49 is read as "da" and is one type of auxiliary particle (end form), and the morpheme information thereof is an inflection.

The morpheme J50 is a punctuation mark indicating the full stop (that is, it corresponds to the period "."), and the morpheme information thereof is an inflection.

Likewise, the English sentence is divided into morphemes E40, E41, E42, E43, E44, E45 and E46 as shown in FIG. 14, each morpheme is looked up in the dictionary to obtain parts of speech and morpheme information as follows.

The morpheme E40 is "He" and is a personal pronoun, and the morpheme information thereof is irregular conjugation (the original form thereof is "it"; the plural form thereof is "they".

The morpheme E41 is "will" and is an auxiliary verb and has no particular morpheme information.

The morpheme E42 is "take" and is a verb, and the morpheme information thereof is regular conjugation for singular form and plural form.

The morpheme E43 is "a" and is an article (indefinite article) and has no particular morpheme information.

The morpheme E44 is "degree" and is a noun, and the morpheme information thereof is regular conjugation.

The morpheme E45 is "easily" and is an adverb and has no particular morpheme information.

The morpheme E46 is "." and is a punctuation mark indicating the period and has no particular morpheme information.

The unregistered word checking section 33 checks unregistered words of Japanese and English, and when an unregistered word is contained in the idiomatic phrase portion, the unregistered word checking section 33 transfers the detected unregistered word to the unregistered word registering section 35 for processing the unregistered word.

The matching rule creating section 34 creates a pattern matching rule for pattern matching of the idiomatic phrase based on an input sentence subjected to the morpheme analysis. In this case, a matching rule for replacing idiomatic phrases which are weakly linked idioms by the following replacing symbols is created according to the type of the pattern matching used.

(a) Character String Matching:

In the case of character string matching, the character string pattern of an idiomatic phrase specified by the user and a corresponding replacing symbol are registered into a rule file R1.

In the matching rule file R1, for example, a replacing symbol X1 shown in FIG. 15 and information of an idiomatic phrase pattern Y1 shown in FIG. 16 are registered. The idiomatic phrase pattern Y1 shown in FIG. 16 is constructed by an element P11 (which is read as "gakuiwo" and corresponds to "degree") and an element P12 (which is read as "shutoku" and corresponds to "take"). Irrespective of whether the elements P11 and P12 of the idiomatic phrase pattern Y1 shown in FIG. 16 are successively or separately placed, it is replaced by the replacing symbol X1 shown in FIG. 15. The replacing symbol X1 shown in FIG. 15 has the elements P11 and P12 connected by "*" and disposed between marks "<" and ">" and indicates that the elements P11 and P12 are treated together.

(b) Matching Using the Result of Morpheme Analysis:

In the case of matching using the result of morpheme analysis, the character string pattern of an idiomatic phrase specified by the user, dictionary information of morphemes constructing the pattern and a corresponding replacing symbol are registered into the matching rule file R1.

In the matching rule file R1, for example, the replacing symbol X1 shown in FIG. 15 and morpheme analysis information Y2 obtained as the result of morpheme analysis shown in FIG. 17 are registered. The morpheme analysis information Y2 shown in FIG. 17 is constructed by information indicating that an element P21 (which is read as "gakui" and corresponds to "degree") is a common noun and an independent word, information indicating that an element P22 (which is read as "wo") is one type of auxiliary particle and is an adjunct word, information indicating that an element P23 (which is read as "shutoku" and corresponds to "take") is an "s" series irregular conjugation noun (which can be modified into a verb by adding an inflection thereto) and an independent word.

(c) Matching Using the Result of Syntax Analysis:

In the case of matching using the result of syntax analysis, the character string pattern of an idiomatic phrase specified by the user, dictionary information of morphemes constructing the pattern and a corresponding replacing symbol are registered into the matching rule file R1.

In the matching rule file R1, for example, the replacing symbol X1 shown in FIG. 15, morpheme information Y3 shown in FIG. 18 and syntax analysis information Y4 obtained as the result of syntax analysis as shown in FIG. 19 are registered. The morpheme information Y2 shown in FIG. 18 is constructed by an element P21 (which is read as "gakui" and corresponds to "degree"), an element P22 (which is read as "wo") and an element P23 (which is read as "shutoku" and corresponds to "take") which are the same as those elements of FIG. 17. The syntax analysis information Y4 shown in FIG. 19 indicates a sentence structure in which the element P23 takes an object of the element P21.

The unregistered word registering section 35 registers the received unregistered word into an analysis dictionary D1 by a simple dictionary editor or unregistered word processing.

The dictionary entry creating section 36 creates a dictionary entry of an idiomatic phrase based on the dictionary entry of morpheme of the result A1 of analysis using the analysis dictionary D1 in the morpheme analyzing section 2.

For example, dictionary entries like the contents shown in FIGS. 20 and 21 are created. FIG. 20 indicates that the replacing symbol X1 shown in FIG. 15 is treated as a verb and independent word and FIG. 21 indicates that "take a degree" is treated as a verb and regularly varies according to the singular or plural form.

The idiomatic phrase dictionary registering section 37 registers data created in the dictionary entry creating section 36 into a translation dictionary D2.

Figure 4:
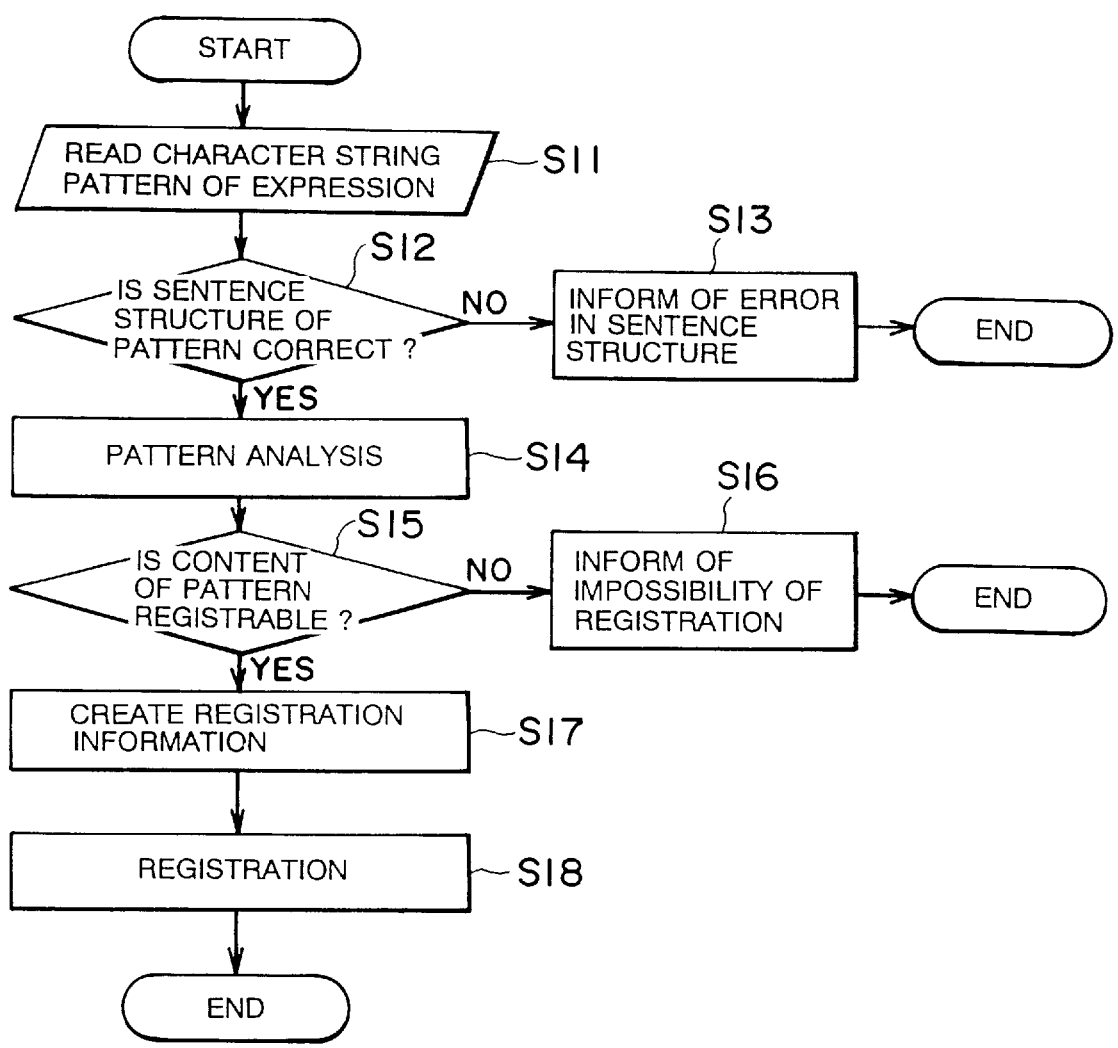
FIG. 4 is a flowchart for illustrating the operation of the idiomatic phrase registration system of FIG. 3.

Next, the operation of the idiomatic phrase registration system with the above construction is explained with reference to the flowchart shown in FIG. 4.

When the system starts, the character string pattern of a to-be-registered expression (for example, a sentence having a to-be-registered idiomatic phrase portion put in the braces "{ }") input via the idiomatic phrase input section 31 is read (step S11). As the preprocessing of registration, the sentence structure of a symbol in the thus read expression (for example, the braces "{ }" for the to-be-registered idiomatic phrase portion) is checked (step S12), and if the sentence structure is not correct, an error of the sentence structure is informed by display of an error message or the like (step S13), and the process is ended.

When it is determined in the step S12 that the sentence structure is correct, analysis of the character string pattern, for example, the morpheme analysis is effected at a level required for registration in the morpheme analyzing section 32 (step S14).

Whether the content of the character string pattern of the input expression can be registered or not (for example, whether a noun expression is input in a system into which a verbal expression is to be input) is determined based on the result of analysis in the step S14 by the matching rule creating section 34 (step S15), and if it cannot be registered, impossibility of registration is informed by display of an error message or the like (step S16) and the process is ended.

If it is determined in the step S15 that the content of the pattern cannot be registered, a text replacing rule or registration information such as dedicated words is created in the matching rule creating section 34 and dictionary entry creating section 36 (step S17) and registered into the matching rule file R1 and translation dictionary D2 (step S18) and the process is ended.

Next, an example of the concrete process in the above system is explained.

For example, a Japanese sentence J5 shown in FIG. 22 is read as "kare wa {hara no} taihen {ookii} hito da" and has the meaning of "He is a very generous man". The meaning of a combination of two portions put in the braces "{ }" is "generous". When an expression of the Japanese sentence J5 shown in FIG. 22 is read in the step S11, whether the paired relation between the brace "{" and the brace "}" is correct or not and whether the braces "{" and "}" are nested or not is determined in the step S12.

For example, as in a Japanese sentence J6 shown in FIG. 23, if the paired relation between the braces "{" and "}" which must make a pair is incomplete, it is determined that the sentence contains error data and the process proceeds to the step S13 to inform occurrence of an error in the sentence structure.

In the step S14, an input expression is divided into morphemes J50 to J58 as shown in FIG. 24 and the positions of the braces are determined.

The morpheme J50 is read as "kare", the morpheme J51 is read as "wa", and a combination of the morphemes corresponds to "he". The morpheme J52 is read as "hara", the morpheme J53 is read as "no", and a combination of the morphemes corresponds to "stomach". The morpheme J54 is read as "taihen" and corresponds to "very". The morpheme J55 is read as "ooki", the morpheme J56 is read as "i", and a combination of the morphemes corresponds to "large". The morpheme J57 is read as "hito" and corresponds to "man". The morpheme J58 is read as "da" and corresponds to "is".

If a pattern of (noun), (auxiliary particle), - - -, (adjective stem), (adjective participial adjective inflection) is present in the registrable patterns of morphemes which are previously registered in the system, whether the content put in the input braces "{ }" is fit for the pattern or not is determined in the step S15.

Figures 25, 26, 27:
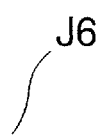
FIG. 25 is a figure for concretely illustrating the operation of the idiomatic phrase registration system of FIG. 3.
FIG. 26 is a figure for concretely illustrating the operation of the idiomatic phrase registration system of FIG. 3.
FIG. 27 is a figure for concretely illustrating the operation of the machine translation system of FIG. 5.

In the step S17, a re-writing rule for replacing a given idiom by the interpretation thereof "generous", for example, replacing a pattern of FIG. 25 by a pattern of FIG. 26 is created.

That is, the pattern of FIG. 25 is constructed by [*A], element P50, element P51, [*B], element P52, element P53, and [*C]. The element P50 is a noun like the morpheme J52. The element P51 is an auxiliary particle like the morpheme J53. The element P52 is the stem of an adjective like the morpheme J55. The element P53 is an inflection of the participial adjective form of adjective like the morpheme J56.

The pattern of FIG. 25 is replaced by the pattern of FIG. 26.

That is, the pattern of FIG. 26 is constructed by [*A], [*B], element P54, element P55, and [*C]. The element P54 is a read as "kandai" and is a stem of adjective, the element P55 is read as "na" and is an inflection of the participial adjective form of an adjective. A combination of the elements P54 and P55 corresponds to "generous".

In this case, [*A], [*B], [*C] match with the arrangement of given morphemes and the contents thereof are copied from FIG. 25 to FIG. 26.

In the step S18, the above re-writing rule is registered into the system.

Thus, if the user specifies and inputs an idiomatic phrase to be registered, the idiomatic phrase registration system subjects the sentence containing the above idiomatic phrase to the morpheme analysis, subjects the dictionary entry thereof to the morpheme analysis, automatically creates the dictionary entry thereof based on the result of morpheme analysis, and registers the same into the translation dictionary. In the case of weakly linked word, a pattern matching rule used for translation is automatically created at the same time as the process of dictionary registration.

According to the idiomatic phrase registration system, the analysis of a sentence containing a weakly linked idiom which cannot be effected in the prior art can be correctly effected by automatically creating a pattern matching rule and effecting the replacing process by use of the pattern matching rule.

[Fourth Embodiment]

Figure 5:
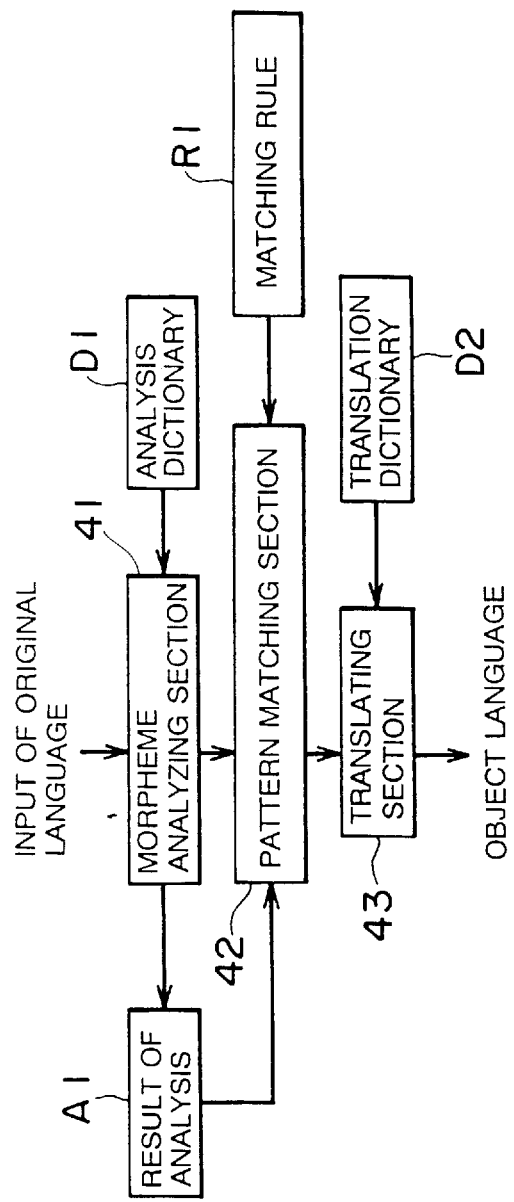
FIG. 5 is a block diagram showing the construction of a machine translation system including a sentence analyzing apparatus according to a fourth embodiment of this invention.

The construction of a machine translation system including a sentence analyzing apparatus according to a fourth embodiment of this invention is shown in FIG. 5.

The translation system receives a sentence which the user wants to translate, subjects the sentence to the morpheme analysis, subjects the result of morpheme analysis to the pattern matching, and if a weakly linked idiom is contained in the sentence, it replaces the idiom by referring to the entry words of the dictionary for weakly linked idioms and translates the sentence by use of a translation dictionary. The translation system can effect the correct analysis by effecting the pattern matching according to the pattern matching rule and output the correct result of translation even when the idiomatic phrase appears in the weakly linked form in the sentence.

The translation system of FIG. 5 includes a morpheme analyzing section 41, pattern matching section 42 and translating section 43 and uses the translation dictionary D2 and matching rule file R1 obtained by the idiomatic phrase registration system of FIG. 3.

The morpheme analyzing section 41 subjects a sentence of original language (for example, Japanese) input by the user to the morpheme analysis.

For example, the Japanese sentence J4 shown in FIG. 13 can be obtained by dividing the Japanese sentence J1 shown in FIG. 7 into morphemes according to the morpheme analysis.

The pattern matching section 42 checks whether the registered pattern is present in the sentence or not according to the rule of the matching rule file R1 created in the matching rule creating section 34 of the idiomatic phrase registration system of FIG. 3, for example. If the registered pattern is present, it is replaced by an entry word of the pattern registered in the translation dictionary D2.

For example, a registered pattern (put in brackets "[ ]") is recognized by the matching rule as indicated by a Japanese sentence J6 shown in FIG. 27 from the Japanese sentence J1 shown in FIG. 7.

If the above pattern is recognized, the pattern matching section 42 removes the recognized pattern from the sentence and inserts a replacing symbol X1 of FIG. 15 into a right-end portion in which the pattern was present so as to make a Japanese sentence J7 as shown in FIG. 28.

The translating section 43 translates the sentence from the original language (for example, Japanese) to the object language (for example, English) by use of the translation dictionary D2.

That is, the translation is effected as follows:

If an input sentence is the Japanese sentence J1, the Japanese sentence J7 is obtained by the pattern matching/replacing process. The following English sentence which is the same as the English sentence E2 of FIG. 10 or the English sentence E4 of FIG. 14 is obtained as the result of translation of the above Japanese sentence into an English sentence.

"He will take a degree easily."

Figure 6:
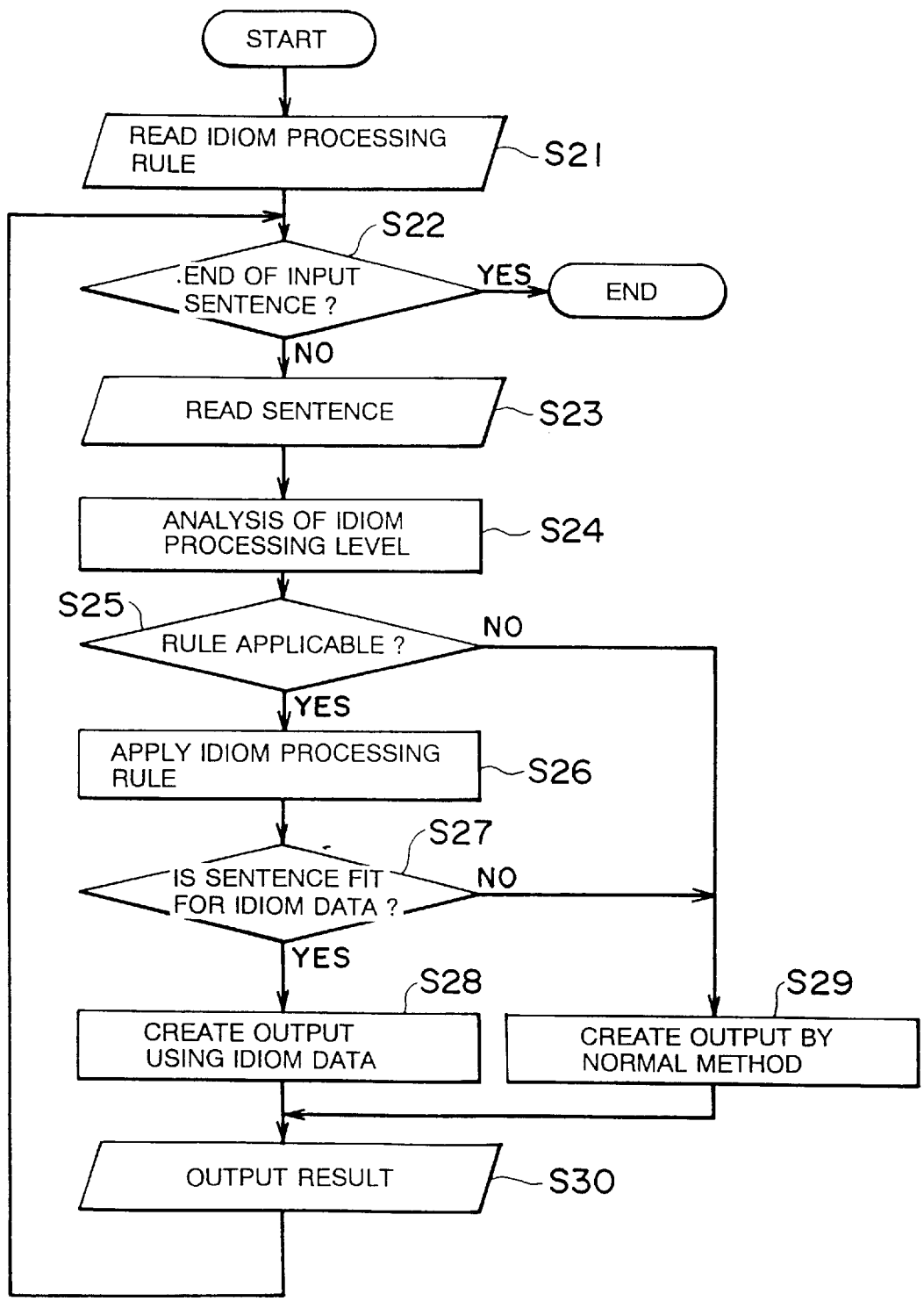
FIG. 6 is a flowchart for illustrating the operation of the machine translation system of FIG. 5.

Next, the detail operation of the machine translation system with the above construction is explained with reference to the flowchart of FIG. 6.

When the system starts, the idiom processing rule for translation, that is, pattern matching rule for translation is read into the system (step S21). Next, whether the input sentence comes to an end or not is determined (step S22), and if the input sentence is not ended (including a case wherein no sentence is input), the process of reading an input sentence is effected (step S23).

The input sentence read in the step S23 is analyzed at the idiom processing level (step S24) and whether the rule can be applied or not is determined (step S25). If it is determined in the step S25 that the rule can be applied, the idiom processing rule is applied (step S26) and whether or not the sentence is fit for idiom data is determined (step S27). If it is determined in the step S27 that the sentence is fit for idiom data, the translation process is effected by use of the idiom data and a translation output is created (step S28).

If it is determined in the step S27 that the sentence is not fit for idiom data, or If it is determined in the step S25 that the rule cannot be applied, the translation process is effected and a translation output is created by use of the normal method (step S29).

If a translation output is created in the step S28 or S29, the thus created translation result is output (step S30) and the process is returned to the step S22.

In the step S22, if the input sentence has come to an end, the process is ended.

Next, a concrete example is explained.

For example, a rule for converting a pattern of FIG. 29 into a pattern of FIG. 30 corresponding to a case wherein the pattern of FIG. 25 is converted into the pattern of FIG. 26 is read.

In this example, it is supposed to effect the rewriting at the character string level and *A, *B, *C in FIG. 29 are respectively collated with given character strings. In FIG. 30, it is supposed that the collated contents of *A, *B, *C can be developed. It is determined that the spelling "<GENEROUS>" does not appear in the normal input and the word is recognized as an adjective of "generous" when it is translated into English, and the spelling and the English word are described in one-to-one correspondence in the Japanese-English dictionary D2 for machine translation (the dictionary is set together with the re-writing rule).

Figures 31, 32:
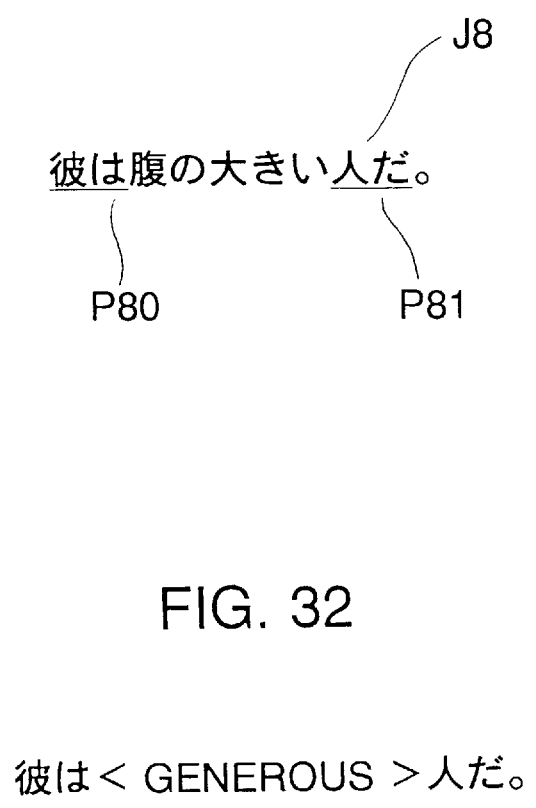

In the step S23, for example, a Japanese sentence J8 shown in FIG. 31 is input. In the step S24, a sentence of character code string is divided into units of Japanese characters in the case of character string level. In the case of processing of morpheme level, the morpheme analysis is effected.

In the step S25, it is collated with the left side of the prepared rule. For example, whether they correspond to *A=P80, *B="", *C=P81 or not is checked. The element P80 is read as "karewa" and the meaning thereof is "he". The element P81 is read as "hitoda" and corresponds to "is a man".

In the step S26, the sentence is synthesized according to the rule of FIG. 30. For example, an expression shown in FIG. 32 is obtained.

In the steps S27 and S28, the spelling "<GENEROUS>" is translated as idiom data.

In the step S30, for example, the following sentence is output:

"He is a generous man."

Thus, the translation is effected. Of course, the idiomatic phrase registration system of FIG. 3 and the machine translation system of FIG. 5 can be combined.

As the weakly linked expressions, the following examples are given:

make good use of - - - see - - - to the door drop in with - - - appeared to - - - in a dream

Thus, the effective sentence analysis can be effected for weakly linked idioms.

According to the machine translation system of FIG. 5, a sentence containing a weakly linked idiom which cannot be correctly analyzed in the prior art can be easily and correctly analyzed by effecting the replacing process by use of the pattern matching rule.

Further, the idiom recognition can be effected at higher speed than that by another method by effecting the pattern matching by use of the character string matching.

Further, the correct idiom recognition can be attained for a sentence containing a word which is one of a large number of homonyms by effecting the pattern matching by use of the result of morpheme analysis.

In addition, the correct idiom recognition can be attained for a sentence containing words having a complicated connection relation by effecting the pattern matching by use of the result of syntax analysis.

The sentence analysis according to this invention is applied not only to the machine translation system, but also to a keyword retrieval system or a system which analyzes a simple sentence of natural language.

What is claimed is:

1. A sentence analyzing method comprising:

a rule preparing step for preparing a pattern matching rule for an idiom having a plurality of portions which can be separately placed;

a pattern matching step for effecting pattern matching for a sentence based on the pattern matching rule to recognize the idiom having the separately placed portions;

a replacing step for replacing the plurality of portions constructing the idiom recognized by the pattern matching by a series of symbolized pattern expressions; and an analyzing step for analyzing the sentence processed in said replacing step.

2. A sentence analyzing method according to claim 1, wherein said pattern matching step includes a step for effecting the pattern matching based on a character string pattern.

3. A sentence analyzing method according to claim 1, wherein said pattern matching step includes a step for effecting the pattern matching based on a pattern of the result of morpheme analysis.

4. A sentence analyzing method according to claim 1, wherein said pattern matching step includes a step for effecting the pattern matching based on a pattern of the result of syntax analysis.

5. A sentence analyzing method comprising:

an input step for receiving a sentence including an idiom portion having a plurality of separately placed portions and having a mark attached thereto;

a rule creating step for analyzing the input sentence and creating a pattern matching rule for recognizing the idiom portion having a plurality of separately placed portions and having a mark attached thereto;

a pattern matching step for effecting pattern matching for another sentence based on the pattern matching rule created in said rule creating step and recognizing the idiom having the separately placed portions;

a replacing step for replacing the plurality of portions constructing the idiom recognized in said pattern matching step by a series of symbolized pattern expressions; and an analyzing step of analyzing the sentence processed in said replacing step.

6. A sentence analyzing method according to claim 5, wherein said rule creating step includes a step for creating the pattern matching rule based on a character string pattern.

7. A sentence analyzing method according to claim 6, wherein said pattern matching step includes a step for effecting the pattern matching based on a character string pattern.

8. A sentence analyzing method according to claim 5, wherein said rule creating step includes a step for creating the pattern matching rule based on a pattern of the result of morpheme analysis.

9. A sentence analyzing method according to claim 8, wherein said pattern matching step includes a step for effecting the pattern matching based on a pattern of the result of morpheme analysis.

10. A sentence analyzing method according to claim 5, wherein said rule creating step includes a step for creating the pattern matching rule based on a pattern of the result of syntax analysis.

11. A sentence analyzing method according to claim 10, wherein said pattern matching step includes a step for effecting the pattern matching based on a pattern of the result of syntax analysis.

12. A rule creating method comprising:
    an input step for receiving a sentence including an idiom portion having a plurality of separately placed portions and having a mark attached thereto; and
    a rule creating step for analyzing the input sentence and creating a pattern matching rule for recognizing the idiom portion having a plurality of separately placed portions and having a mark attached thereto.

13. A rule creating method according to claim 12, wherein said rule creating step includes a step for creating the pattern matching rule based on a character string pattern.

14. A rule creating method according to claim 12, wherein said rule creating step includes a step for creating the pattern matching rule based on a pattern of the result of morpheme analysis.

15. A rule creating method according to claim 12, wherein said rule creating step includes a step for creating the pattern matching based on a pattern of the result of syntax analysis.

16. A sentence analyzing apparatus comprising:
    pattern matching means for holding a pattern matching rule for idioms each having a plurality of portions which can be separately placed, for effecting pattern matching for a sentence based on the pattern matching rule and for recognizing the idiom having the separately placed portions;
    replacing means for replacing the plurality of portions constructing the idiom recognized by said pattern matching means by a series of symbolized pattern expressions; and
    analyzing means for analyzing the sentence processed in said replacing means.

17. A sentence analyzing apparatus according to claim 16, wherein said pattern matching means includes means for effecting the pattern matching based on a character string pattern.

18. A sentence analyzing apparatus according to claim 16, wherein said pattern matching means includes means for effecting the pattern matching based on a pattern of the result of morpheme analysis.

19. A sentence analyzing apparatus according to claim 16, wherein said pattern matching means includes means for effecting the pattern matching based on a pattern of the result of syntax analysis.

20. A sentence analyzing apparatus comprising:
    an input means for receiving a sentence including an idiom portion having a plurality of separately placed portions and having a mark attached thereto;
    rule creating means for analyzing the input sentence and creating a pattern matching rule for recognizing the idiom portion having a plurality of separately placed portions and having a mark attached thereto;
    pattern matching means for effecting the pattern matching for another sentence based on the pattern matching rule created by said rule creating means and recognizing the idiom having the separately placed portions;
    replacing means for replacing the plurality of portions constructing the idiom recognized by said pattern matching means by a series of symbolized pattern expressions; and
    analyzing means for analyzing the sentence process in said replacing means.

21. A sentence analyzing apparatus according to claim 20, wherein said rule creating means creates a pattern matching rule based on a character string pattern.

22. A sentence analyzing apparatus according to claim 21, wherein said pattern matching means effects the pattern matching based on a character string pattern.

23. A sentence analyzing apparatus according to claim 20, wherein said rule creating means creates a pattern matching rule based on a pattern of the result of morpheme analysis.

24. A sentence analyzing apparatus according to claim 23, wherein said pattern matching means effects the pattern matching based on a pattern of the result of morpheme analysis.

25. A sentence analyzing apparatus according to claim 20, wherein said rule creating means creates a pattern matching rule based on a pattern of the result of syntax analysis.

26. A sentence analyzing apparatus according to claim 25, wherein said pattern matching means effects the pattern matching based on a pattern of the result of syntax analysis.

27. A sentence analyzing apparatus comprising:
    input means for receiving a sentence including an idiom portion having a plurality of separately placed portions and having a mark attached thereto; and
    rule creating means for analyzing the input sentence and creating a pattern matching rule for recognizing the idiom portion having a plurality of separately placed portions and having the mark attached thereto.

28. A sentence analyzing apparatus according to claim 27, wherein said rule creating means creates a pattern matching rule based on a character string pattern.

29. A sentence analyzing apparatus according to claim 27, wherein said rule creating means creates a pattern matching rule based on a pattern of the result of morpheme analysis.

30. A sentence analyzing apparatus according to claim 27, wherein said rule creating means creates a pattern matching rule based on a pattern of the result of syntax analysis.

31. A machine translation apparatus comprising;
    pattern matching means for holding a pattern matching rule for idioms each having a plurality of portions which can be separately placed, for effecting pattern matching for a sentence based on the pattern matching rule and for recognizing the idiom having the separately placed portions;
    replacing means for replacing the plurality of portions constructing the idiom recognized by said pattern matching means by a series of symbolized pattern expressions; and
    translation processing means for analyzing the sentence processed in said replacing means and effecting the translation process.

* * * * *